United States Patent Office 2,905,572
Patented Sept. 22, 1959

2,905,572

PHOSPHOR COATING OF IMPROVED ADHERENCE AND PREPARATION THEREOF

Shannon Jones, East Cleveland, Ohio, assignor to General Electric Company, a corporation of New York No Drawing. Application October 2, 1958
Serial No. 764,765

9 Claims. (Cl. 117—33.5)

My invention relates to a method of preparing a phosphor coating of improved adherence and to the resultant phosphor screen.

It is an object of my invention to provide a material which may be added to phosphors or their suspensions and which will produce better adherence of the phosphor to a glass base such as the envelope of a fluorescent lamp. It is a further object to provide an additive for phosphor suspensions in organic media which will improve the adherence of the phosphor particles without adverse effect on the efficiency or light output.

Many proposals have been made in the past to minimize the flaking or "coating-off" of phosphor coatings on glass lamp envelopes, including the use of additives in the phosphor suspension, use or addition of extremely finely divided phosphor, lubrication of the envelope surface to prevent checking or seizing of the envelope during handling which produces flaking, etc. While some of the prior methods were to some extent successful, each of them possessed some disadvantage or presented certain problems.

In accordance with the present invention, I have found that materially improved adherence, without loss in light output, is obtained by employing an additive comprising a mixture of materials which will deposit what I believe to be a calcium borate in situ upon lehring the phosphor coating. The use of calcium borate added as such to the phosphor suspension has proved not to be satisfactory in improving adherence. Accordingly, I preferably employ a calcium compound and a boron compound which are decomposable upon heating to yield CaO and $B_2O_3$, respectively, and preferably in proportions having a CaO:$B_2O_3$ molar ratio of from about 3:1 to 1:2. It is desirable that the calcium compound and the boron compound be soluble in the phosphor binder solution, that they be compatible, and that they break down without leaving undesirable residues. Particularly good results have been obtained with calcium nitrate as the source of calcium. As a source of boron, I may employ ethyl borate, boric oxide, boric acid, butyl borate, or other derivatives of boric oxide.

It may also be advantageous to employ a coupling agent such as "Cellosolve," which is monoethyl ether of ethylene glycol. Other coupling agents include diacetone alcohol and ethyl lactate.

Good results have been obtained with an additive prepared by dissolving 23.6 grams of Ca(NO$_3$)$_2$.4H$_2$O in 150 ml. of isopropanol and, while stirring 200 ml. of ethyl borate solution (ethyl borate in alcohol and having an assay of 0.0656 gram $B_2O_3$/ml.), adding all the calcium nitrate solution.

The additive is added in small amounts, preferably about 1 to 4 percent by volume, to any of the well-known suspensions of inorganic phosphor in a solution of organic binder such as cellulosic binders, including nitrocellulose and ethyl cellulose and mixtures thereof in a suitable solvent such as butyl acetate and naphtha. When employing an aqueous phosphor suspension, the additive may consist of an aqueous solution of calcium nitrate plus boric acid.

Improved adherence has been obtained by the addition of the additive to suspensions of a wide variety of phosphors including zinc silicate:Mn, cadmium borate:Mn, calcium tungstate:Pb, barium silicate:Pb, calcium silicate:Pb,Mn, magnesium tungstate, and the halophosphate phosphors including calcium chlorofluorophosphate activated with antimony alone or antimony plus manganese.

A presently preferred example of an additive solution is as follows:

Ca(NO$_3$)$_2$.4H$_2$O _____ grams__ 24
"Cellosolve" _____ ml__ 150
Ethyl borate solution (solution of ethyl borate in alcohol and having an assay of 0.0656 gram $B_2O_3$/ml.) _____ ml__ 210

The calcium nitrate is dissolved in the "Cellosolve" and then the ethyl borate solution is added while stirring.

The above solution (which has a CaO:$B_2O_3$ molar ratio of about 1:2) when added to phosphor suspensions in organic media, produces substantially improved adherence and in many cases the light output of the fluorescent lamp is actually increased. When employing CaO:$B_2O_3$ ratios of 1:2 and 1:1, the phosphor-to-glass bond appears to be favored, whereas for ratios of 2:1 and 3:1 the phosphor-to-phosphor bond is predominant.

The amount of "Cellosolve" in the above example of additive solution is not at all critical. It is employed in an amount sufficient to keep the calcium nitrate in solution, but an excess is not harmful and may in fact be desirable, whether introduced initially into the additive solution or later into the phosphor suspension, to prevent a mottled appearance of the coating when it is applied during periods of high humidity.

While I have generally used the readily-available tetrahydrate of the calcium nitrate, I have also found that an equivalent amount of anhydrous calcium nitrate is equally effective in the additive.

In the manufacture of fluorescent lamp coatings, the tubular glass envelope is coated on its interior surface in any suitable manner, preferably by flushing, with a quantity of the phosphor suspension containing the additive, the coating is dried and then fired at a temperature preferably above about 600° C. but below the softening point of the envelope and for a time sufficient to burn out the organic binder and effect a reaction of the CaO and $B_2O_3$ components of the additive to form a material which tightly bonds the phosphor particles to each other and to the surface of the glass envelope.

A typical phosphor suspension may be prepared by mixing 1000 grams of powdered phosphor such as calcium halophosphate:Sb,Mn with 800 ml. of a binder solution consisting of about 0.5 percent by weight of high viscosity (dynamite grade) nitrocellulose dissolved in a solution of 60 percent by volume of butyl acetate plus 40 percent naphtha and having a flow time through a Parlin #7 cup at 25° C. of between 45 and 60 seconds. This mixture is milled for ten hours in a one gallon pebble mill. Then add 700 ml. more of the said binder solution together with 400 ml. of a thinner consisting of 50 percent by volume butyl acetate plus 50 percent naphtha, and also add 60 ml. of the additive solution described above and consisting of 24 grams Ca(NO$_3$)$_2$.4H$_2$O, 150 ml. "Cellosolve" and 210 ml. ethyl borate solution (ethyl borate in alcohol and having an assay of 0.0656 gram $B_2O_3$/ml.). The suspension is then milled for another five minutes to mix the ingredients. When desired, this suspension is further thinned with sufficient of the said thinner to give a desired optical density of the coating. Also, the additive may be added to the binder solution before the first milling or at any other convenient time.

This suspension may then be coated by flowing it onto the interior surface of a tubular glass lamp envelope, permitting it to dry, and then firing it in a lehr for a period of about three to four minutes with the glass envelope reaching a peak temperature of about 600° C. or higher.

In the above example of a typical phosphor suspension, the nitrocellulose binder may be replaced by ethyl cellulose or by a mixture thereof, for instance one-third nitrocellulose and two-thirds ethyl cellulose. Alternatively, I may employ a water soluble binder, in which event the additive may consist of an aqueous solution of calcium nitrate and boric acid.

The improved adherence of coatings prepared with the use of the additive disclosed herein is clearly demonstratable by employing the standard snap tester used in the art. Lamp efficiency tests have also shown that whereas the use of additives heretofore employed, such as boric acid alone, have resulted in a loss of efficiency of about 6 percent, lamps prepared as disclosed herein suffer substantially no loss in efficiency and in some cases the efficiency is actually improved.

What I claim as new and desire to secure by Letters Patent of the United States is:

1. The method of forming a phosphor coating of improved adherence on a glass surface which comprises preparing a suspension of finely divided inorganic phosphor in a solution of organic binder which is decomposable upon heating and of a consistency suitable for flowing on the glass surface, adding to the suspension a small amount in the approximate range of 1 to 4 percent by volume of an additive comprising essentially a solution compatible with the suspension and containing calcium nitrate and a material of the class consisting of boric oxide and derivatives thereof which yield boric oxide upon heating and having a $CaO:B_2O_3$ molar ratio of from about 3:1 to 1:2, flowing the resulting suspension onto the glass surface, drying the coating so formed and firing it at a temperature and for a time sufficient to decompose the binder and effect a reaction between the calcium nitrate and boric oxide components of the additive.

2. The method of forming a phosphor coating of improved adherence on a glass surface which comprises preparing a suspension of finely divided inorganic phosphor in a solution of organic binder which is decomposable upon heating and of a consistency suitable for flowing on the glass surface, adding to the suspension a small amount in the approximate range of 1 to 4 percent by volume of an additive comprising essentially a solution compatible with the suspension and containing calcium nitrate and ethyl borate and having a $CaO:B_2O_3$ molar ratio of from about 3:1 to 1:2, flowing the resulting suspension onto the glass surface, drying the coating so formed and firing it at a temperature and for a time sufficient to decompose the binder and effect a reaction between the calcium nitrate and boric oxide components of the additive.

3. The method of forming a phosphor coating of improved adherence on a glass surface which comprises preparing a suspension of finely divided inorganic phosphor in a solution of organic binder which is decomposable upon heating and of a consistency suitable for flowing on the glass surface, adding to the suspension a small amount in the approximate range of 1 to 4 percent by volume of an additive comprising essentially a solution compatible with the suspension and containing calcium nitrate dissolved in monoethyl ether of ethylene glycol and a material of the class consisting of boric oxide and derivatives thereof which yield boric oxide upon heating and having a $CaO:B_2O_3$ molar ratio of from about 3:1 to 1:2, flowing the resulting suspension onto the glass surface, drying the coating so formed and firing it at a temperature and for a time sufficient to decompose the binder and effect a reaction between the calcium nitrate and boric oxide components of the additive.

4. The method of forming a phosphor coating of improved adherence on a glass surface which comprises preparing a suspension of finely divided inorganic phosphor in a solution of organic binder which is decomposable upon heating and of a consistency suitable for flowing on the glass surface, adding to the suspension a small amount in the approximate range of 1 to 4 percent by volume of an additive comprising essentially a solution compatible with the suspension and containing calcium nitrate dissolved in monoethyl ether of ethylene glycol and ethyl borate and having a $CaO:B_2O_3$ molar ratio of from about 3:1 to 1:2, flowing the resulting suspension onto the glass surface, drying the coating so formed and firing it at a temperature and for a time sufficient to decompose the binder and effect a reaction between the calcium nitrate and boric oxide components of the additive.

5. A phosphor coating composition comprising a suspension of finely divided inorganic phosphor in a solution of organic binder which is decomposable upon heating and of a consistency suitable for flowing on a glass surface, and containing a small amount in the approximate range of 1 to 4 percent by volume of an additive solution compatible with the suspension and comprising essentially a calcium nitrate solution and a solution of material of the class consisting of boric oxide and derivatives thereof which yield boric oxide upon heating and having a $CaO:B_2O_3$ molar ratio of about 3:1 to 1:2.

6. A phosphor coating composition comprising a suspension of finely divided inorganic phosphor in a solution of organic binder which is decomposable upon heating and of a consistency suitable for flowing on a glass surface, and containing a small amount in the approximate range of 1 to 4 percent by volume of an additive solution compatible with the suspension and comprising essentially a solution of calcium nitrate in monoethyl ether of ethylene glycol and a solution of material of the class consisting of boric oxide and derivatives thereof which yield boric oxide upon heating and having a $CaO:B_2O_3$ molar ratio of about 3:1 to 1:2.

7. A phosphor coating composition comprising a suspension of finely divided inorganic phosphor in a solution of organic binder which is decomposable upon heating and of a consistency suitable for flowing on a glass surface, and containing a small amount in the approximate range of 1 to 4 percent by volume of an additive solution compatible with the suspension and comprising essentially a calcium nitrate solution and an ethyl borate solution and having a $CaO:B_2O_3$ molar ratio of about 3:1 to 1:2.

8. A phosphor coating composition comprising a suspension of finely divided inorganic phosphor in a solution of organic binder which is decomposable upon heating and of a consistency suitable for flowing on a glass surface, and containing a small amount in the approximate range of 1 to 4 percent by volume of an additive solution compatible with the suspension and comprising essentially a solution of calcium nitrate in monoethyl ether of ethylene glycol and an ethyl borate solution and having a $CaO:B_2O_3$ molar ratio of about 3:1 to 1:2.

9. A phosphor screen comprising a glass base having thereon a coating of finely divided inorganic phosphor particles bonded to the glass base by a cementing material consisting of the reaction product of calcium nitrate and boric oxide having a $CaO:B_2O_3$ molar ratio in the range of about 3:1 to 1:2.

References Cited in the file of this patent

UNITED STATES PATENTS 2,298,968    Roberts et al. _____ Oct. 13, 1942
2,344,081    Claude _____ Mar. 14, 1944